United States Patent [19]

Taga et al.

[11] Patent Number: 5,183,678
[45] Date of Patent: Feb. 2, 1993

[54] METHOD FOR PREPARING PUFF SNACK

[75] Inventors: Kazumitsu Taga, Neyagawa; Toshihiko Narukami, Ikoma; Yoshiyuki Miyaoku, Sakai, all of Japan

[73] Assignee: House Food Industrial Co., Ltd., Higashi-Osaka, Japan

[21] Appl. No.: 775,897

[22] Filed: Oct. 15, 1991

[51] Int. Cl.$^5$ .............................................. A23L 1/00
[52] U.S. Cl. .................................. 426/448; 426/460; 426/516; 426/634
[58] Field of Search ............... 426/448, 634, 307, 516, 426/460

[56] References Cited

U.S. PATENT DOCUMENTS 3,851,081 11/1974 Epstein ................................. 426/448
4,748,037 5/1988 Matsumoto et al. ................. 426/634

FOREIGN PATENT DOCUMENTS 61-9252 1/1986 Japan .
63-226246 9/1988 Japan .
2-13352 1/1990 Japan .

OTHER PUBLICATIONS

JP Publication Sho. 63-5067, WPI data.
JP Publication Sho. 59-1459, WPI data.

Primary Examiner—George Yeung
Attorney, Agent, or Firm—Oblon, Spivak, McClelland, Maier & Neustadt

[57] ABSTRACT

A method for preparing a puff snack comprises the steps of puffing an ingredient essentially consisting of a bean which may or may not have the husk and having a water content of 9 to 20% in an extruder at a die temperature ranging from 90° to 150° C. for the ingredient having a water content of 9 to 11%, 100° to 210° C. for the ingredient having a water content of more than 11% and not more than 15% or 160° to 240° C. for the ingredient having a water content of more than 15% and not more than 20% so that the degree of puffing falls within the range of from 3.0 to 28.0 times the volume of the bean to give a puffed product having a water content of not more than 7% by weight after drying or without carrying out drying and then applying fat and oil to the resulting puffed product. The method makes it possible to provide puff snacks having a satisfactory taste peculiar to bean ingredients and a heavy taste with sufficient toughness, being easily mixed with the saliva in the mouth and leaving a pleasant aftertaste.

20 Claims, No Drawings

METHOD FOR PREPARING PUFF SNACK

BACKGROUND OF THE INVENTION

The present invention relates to a method for preparing a puff snack from beans such as pea (*Pisum sativum*) and broad bean (*Vicia faba*) as main starting ingredients and in which the beans are puffed in an extruder.

There have been conventionally known some methods for preparing snack confectioneries which comprise the step of puffing beans as starting ingredients such as pea and broad bean with an extruder, for instance, those disclosed in Japanese Unexamined Patent (hereinafter referred to as "J. P. KOKAI") No. Sho 61-58539 which corresponds to U.S. Pat. No. 4,748,037. The method as disclosed in this patent comprises the step of subjecting beans to extrusion-cooking by passing them through a twin-screw extruder with or without addition of water for controlling the moisture thereof. More specifically, the extrusion cooking is practiced by supplying beans to a feed opening of the extruder while supplying water to the feed opening through a metering pump to control the water content of the beans to a high level in the order of 30 to 40% and then extruding the beans.

The puff snacks prepared by this method have very light and crisp taste. Therefore, they are favorable as confectioneries, but if they are used as snack food or bar food, they are too soft and lack in the taste peculiar to the starting bean.

J. P. KOKAI No. Sho 61-9253 also discloses a method for preparing a snack food which comprises puffing a bean such as pea or broad bean as an ingredient in an extruder. More specifically, this method comprises the steps of puffing a starch ingredient such as wheat flour or wheat starch in a twin-screw extruder, then pulverizing the resulting puffed product, mixing a bean such as pea or broad bean with the pulverized product in an amount ranging from 5 to 50% on the basis of the total amount of the ingredients and again puffing the mixture in a twin-screw extruder.

However, this method suffers from a problem, in addition to the foregoing ones, in that the resulting puffed snack lacks in the taste peculiar to the bean and the color tone thereof. Moreover, the puffing with an extruder must be performed twice and this makes the process complicated and increases the running cost.

Further, J. P. KOKAI No. Sho 59-51746 discloses another method for preparing a snack food which comprises puffing a bean such as pea or broad bean as a starting ingredient in an extruder. According to this patent, it is proved that if only beans are used as starting ingredients, the resulting puffed products do not have porous texture and are hence difficult to eat. The patent further discloses that these problems can be eliminated through the use of a mixture comprising 75 to 25 parts by weight of a bean and 25 to 75 parts by weight of a specific starch ingredient such as tapioca starch as a starting ingredient.

However, the puffed snacks obtained by this method do not have the taste peculiar to the bean used and are insufficient in the color tone of the bean and hardness.

SUMMARY OF THE INVENTION

Accordingly, a primary object of the present invention is to solve the foregoing problems associated with the conventional methods for preparing puff snacks from beans such as pea and broad bean and to provide an improved method for preparing a puff snack by puffing the beans in an extruder.

Another object of the present invention is to provide a method for preparing puff snacks having a satisfactory taste peculiar to starting beans and a heavy taste with sufficient toughness.

Another object of the present invention is to provide a method for preparing puff snacks having a satisfactory taste peculiar to starting material by use of the starting material consisting essentially of beans.

These and other objects of the present invention will be apparent from the following description and examples.

The inventors of this invention have conducted intensive studies to solve the foregoing problems, have found out that the foregoing object can effectively be achieved if the method for preparing a puff snack fulfills the following 5 requirements:

(a) an ingredient essentially comprising beans is used;
(b) an ingredient having a water content within a specific range is used;
(c) the ingredient having a specific water content defined above is puffed at a die temperature condition within a specific range in an extruder so that the degree of puffing falls within a specific range;
(d) the water content of the puffed product is controlled to not more than a specific level; and
(e) the puffed product is subjected to an oil-coating treatment, and thus have completed the present invention.

Thus, according to the present invention, there is provided a method for preparing a puff snack which comprises the steps of puffing an ingredient essentially consisting of a bean which may or may not have the husk and having a water content of 9 to 20% in an extruder at a die temperature ranging from 90° to 150° C. for the ingredient having a water content of 9 to 11%, 100° to 210° C. for the ingredient having a water content of more than 11% and not more than 15% or 160° to 240° C. for the ingredient having a water content of more than 15% and not more than 20% so that the degree of puffing falls within the range of from 3.0 to 28.0 times the volume of the bean to give a puffed product having a water content of not more than 7% by weight after drying or without carrying out drying and then applying fat and oil to the resulting puffed product.

DESCRIPTION OF THE PREFERRED EMBODIMENTS

The method for preparing a puff snack of the present invention will hereinafter be described in more detail.

Beans usable in the present invention preferably include those having a content of fats and oils of not more than 15% by weight (hereinafter simply referred to as "%"), preferably not more than 3%; a protein content ranging from 15 to 60%, preferably 15 to 30%; a carbohydrate content ranging from 40 to 60%. Specific examples thereof include pea, broad bean, azuki bean, kidney bean, cowpea and defatted soybean. These beans may be used alone or in any combination. In this respect, the use of defatted soybean in combination with other beans makes it possible to impart roasted taste to the resulting puff snack. If the defatted soybean is used in combination, the starting ingredient comprises a mixture of 5 to 10 parts by weight of the defatted soybean and 95 to 90 parts by weight of other bean ingredients. When azuki bean, kidney bean and/or cowpea are employed, the resulting puff snack gives out smelling of uncooked ingredients. It is thus preferred to subject these bean ingredients to treatments for removing harsh taste such as immersion in water or boiling treatment to eliminate the smell of harsh taste. The preferred conditions for the removal of the harsh taste are a temperature of around room temperature and a treating time ranging from 2 to 3 hours for water-immersion and a temperature ranging from 95° to 98° C. and a treating time ranging from 15 to 40 minutes for the boiling.

The foregoing bean ingredients may or may not have the husk (epidermis portion). If the ingredients having the husk are employed, the resulting puff snacks are not only rich in dietary fibers but also has the intensive taste peculiar to the starting bean. On the other hand, if those free of husk are employed, the resulting puff snack would have bright color tone. Incidentally, if broad bean is used as a bean ingredient, the husk portion thereof is preferably controlled so that the coarse fiber content thereof falls within the range of from 2.5 to 4.5% preferably 3.0 to 4.5%. This is because if the content is less than the lower limit, the resulting puff snack is liable to have not only poor taste of broad bean as the ingredient but also less compact texture and is relatively soft taste. On the other hand, if the content exceeds the upper limit, the resulting puff snack is often colored brown.

The foregoing bean ingredients may be used in the form of entire grains or properly pulverized grains.

The foregoing bean ingredients desirably have a grain size such that they pass through a sieve having openings of 8000 μm for effectively preventing scorching during extrusion-cooking. More specifically, it is preferred to use entire pea grains capable of passing through a sieve having openings of 8000 μm, while it is preferred to use pulverized pea comprising not less than 45%, preferably not less than 60% of grains which are capable of passing through a sieve having openings of 4000 μm but incapable of passing through a sieve having openings of 1000 μm. When using broad bean, it is preferred that the ingredient comprise not less than 60% of those capable of passing through a sieve having openings of 3000 μm but incapable of passing through a sieve having openings of 1000 μm.

This is because if the content of the starting ingredient having a grain size greater than the upper limit is high, the resulting puff snack is often scorched, while if the content of the grains having a size smaller than the lower limit is high, the ingredient is often insufficiently puffed. This tendency becomes conspicuous, in particular when a short screw type single-screw extruder is employed.

The ingredient used in the present invention essentially consists of the foregoing bean, but may comprise other additives such as seasonings, e.g., common salt and sugars; flavors; and coloring agents, so long as the addition thereof does not adversely affect the effects of the present invention.

It is very important to control the water content of the bean ingredient to 9 to 20%, preferably 9 to 15% and more preferably 12 to 13% (while if a short screw type single-screw extruder is employed as a means for puffing the bean, it is important to adjust the water content to 9 to 16%, preferably 9 to 15% and more preferably 12 to 13%). If the water content of the ingredient is less than the lower limit, scorching of the ingredient and clogging of the extruder are possibly caused during the puffing treatment. On the other hand, it exceeds the upper limit, the resulting puff snack has poor taste peculiar to the bean and relatively soft taste and is insufficiently puffed depending on the treating conditions. When the water content of the bean ingredient is outside of the range defined above, it is preferred to control it by preliminarily adding water to the ingredient or drying it.

The ingredient having a water content falling within the range defined above is then puffed in an extruder at a die temperature ranging from 90° to 240° C. and preferably 90° to 190° C. so that the degree of puffing reaches 3.0 to 28.0, preferably 5.1 to 16.0. In this respect, the degree of puffing is herein determined by cutting the puffed product obtained immediately after the extrusion into a shape geometrically similar to that for the bean as the ingredient (for instance, approximately sphere in case of pea) and then calculating the degree of puffing in terms of the volume ratio of the resulting puff snack to the bean ingredient.

The foregoing die temperature condition, more specifically, ranges from 90° to 150° C. in case where the bean ingredients having a water content ranging from 9 to 11% are used; 100° to 210° C, preferably 140 to 210° C. and more preferably 150° to 190° C. in case where the bean ingredients having a water content of more than 11% and not more than 15% are used; and 160° to 240° C. and preferably 180° to 240° C. in case where the bean ingredients having a water content of more than 15% and not more than 20% are used. If the die temperature is less than the lower limit, the degree of puffing of the resulting puff snack is often insufficient, while if it exceeds the upper limit, the resulting puff snack is often scorched and have a burnt taste or smell.

The degree of puffing is in general 3.0 to 28.0 and more specifically ranges from 3.0 to 23.0, preferably 5.1 to 12.7 and more preferably 5.5 to 7.1 if pea is used alone; and 3.0 to 25.0, preferably 8.4 to 16.0 and more preferably 10.5 to 13.2 if broad bean is used alone.

If the degree of puffing is less than the lower limit, the resulting puff snack is insufficiently puffed and too hard to eat, while if it is more than the upper limit, the resulting puff snack does not have a heavy taste with sufficient toughness, but an extremely soft taste.

The extruders used in the invention is not restricted to specific ones and, for instance, a short screw type single-screw extruder can be used. In addition thereto, other extruders such as a long screw type single-screw extruder or a twin-screw extruder may also be used, but preferably a short screw type single-screw extruder is selected because it can effectively prevent scorching of the resulting puff snack and can provide puff snacks having a taste with good toughness. Further, the short screw type single-screw extruder exhibits additional advantages in that it is cheap and that it has an ability of bulk handling. The single-screw extruder preferably has an L/D ratio ranging from 1 to 5 and a length of the screw ranging from 10 to 20 cm. In addition, it preferably has a compression ratio of 2 to 3.

Moreover, the pressure condition is, for instance, in the range of from 30 to 160 kg/cm$^2$.

The number of revolution of the screw and the feed rate of ingredients required for satisfying the foregoing pressure condition vary depending on various factors such as the kinds of the extruders used, the size of each part of the extruder and the area and number of pores formed in the die, respectively. For instance, if Collet Machine available from Tape Inc. (a short screw type single-screw extruder equipped with a die having two circular pores having a diameter of 2 to 4 mm) is adopted as such an extruder, the number of revolution of the screw ranges from 400 to 1000 rpm, preferably 400 to 600 rpm and the feed rate ranges from 400 to 1800 g/min, preferably 400 to 700 g/min.

Thereafter (preferably, immediately after being extruded through the die of the extruder), the resulting puffed product is cut into pieces having an appropriate length and then optionally subjected to drying treatment such as hot-air drying to thus give the final puffed product having a water content of not more than 7% and preferably not more than 2%. If the water content of the resulting puffed product exceeds 7%, the resulting puff snacks are difficult to cut off with the teeth. The conditions for the drying are, for instance, a temperature ranging from 100° to 190° C. and a drying time ranging from 1 to 20 minutes.

According to the method of the present invention, the resulting puffed product is then subjected to fats and oils-application treatment by means of, for instance, spraying or coating. Thus, the resulting puff snack having a degree of puffing ranging from 3.0 to 28.0 is a puff snack having appropriate toughness and a heavy taste, being easily mixed with saliva and leaving a pleasant aftertaste.

The amount of the fat and oil to be applied ranges from 30 to 150 parts by weight, preferably 40 to 80 parts by weight per 100 parts by weight of the puffed product. In this connection, it is desirable to use fat and oil having a melting point ranging from 0° to 40° C. The temperature of the fat and oil upon application thereof ranges, for instance, 10° to 220° C. and preferably 150° to 220° C. because the resulting puff snack gives out an aroma of bean fried in an oil.

The resulting puffed product may then be sprinkled with, for instance, common salt or other seasonings.

An aqueous seasoning such as an aqueous solution of common salt, soybean sauce or a sugar solution may be applied to the puffed product by a means such as spraying or coating, after or prior to the application of fat and oil. In such case, the puffed product is dried by, for instance, hot-air drying to control the water content thereof to not more than 7% and preferably not more than 2%. Thus, the resulting puff snack has a crisp taste.

The puff snacks of the present invention can be prepared according to the method detailed above.

Then the resulting puff snacks are optionally packaged in a container such as a bag or a box and thereafter sealed airtightly. Materials for the containers are not restricted to specific ones, but preferably light-shielding materials such as aluminum and those on which aluminum is vapor deposited, in case of the puff snacks obtained from pea as the bean ingredient. This permits effective prevention of discoloration of the resulting puff snack and deterioration of the taste during storing the same. From the same point of view, it is preferred to carry out storage of the bean ingredient (in particular storage after pulverization), processes for preparing the puff snack and for packaging in a container and for airtight sealing thereof under substantially light-shielded conditions to effectively prevent the possible discoloration and deterioration of the taste during the storage thereof if the snack is prepared from pea as the bean ingredient.

As has been discussed above in detail, the present invention can provide puff snacks having a satisfactory taste peculiar to starting beans and a heavy taste with sufficient toughness, being easily mixed with the saliva in the mouth and leaving a pleasant aftertaste.

The present invention will hereinafter explained in more detail with reference to the following non-limitative working Examples and the effects practically achieved by the present invention will also be discussed in detail in comparison with Comparative Examples.

EXAMPLE 1

Pulverized pea (obtained by pulverizing pea together with the husk) having a water content of 10% was puffed in Collet Machine available from Tape Inc., i.e., a single-screw extruder provided with a die having two circular pores having a diameter of 3 mm at a die temperature of 90° C., a feed rate of 600 g/min and a number of revolution of 500 rpm and then the puffed product was cut into pieces having a length of the order of 4 cm (the degree of puffing=7).

Then the puffed product was dried by hot-air drying at 180° C. for 2 minutes and thereafter, palm oil were sprayed on the resulting puffed product (water content of 1.7%) in an amount of 60 parts by weight per 100 parts by weight of the product. Then 1% (based on the weight of the puffed product) common salt was sprinkled onto the product to which the palm oil had been sprayed. The resulting puff snack had a sufficient taste peculiar to the pea and a taste with sufficient toughness, could easily be mixed with the saliva in the mouth and left a pleasant aftertaste.

EXAMPLE 2

Pulverized broad bean (obtained by pulverizing broad bean together with the husk) having a water content of 10% was puffed in Collet Machine available from Tape Inc., i.e., a single-screw extruder provided with a die having two circular pores having a diameter of 3 mm at a die temperature of 100° C., a feed rate of 530 g/min and a number of revolution of 500 rpm and then the resulting puffed product was cut into pieces having a length of the order of 4 cm (the degree of puffing=10.4).

Then the puffed product was dried by hot-air drying at 160° C. for 3 minutes and thereafter, palm oil were sprayed on the resulting puffed product (water content of 1.0%) in an amount of 60 parts by weight per 100 parts by weight of the product. Then 1% (based on the weight of the puffed product) common salt was sprinkled onto the product to which the palm oil had been sprayed. The resulting puff snack had a sufficient taste peculiar to the broad bean and a taste with sufficient toughness, could easily be mixed with the saliva in the mouth and left a pleasant aftertaste.

EXAMPLE 3

Pulverized pea (obtained by pulverizing pea together with the husk) having a water content of 10% was puffed in Collet Machine available from Tape Inc., i.e., a single-screw extruder provided with a die having two circular pores having a diameter of 3 mm at a die temperature of 150° C., a feed rate of 600 g/min and a number of revolution of 500 rpm and then the puffed product was cut into pieces having a length of the order of 4 cm (the degree of puffing=5.7).

Then the puffed product was dried by hot-air drying at 180° C. for 2 minutes and thereafter, palm oil were sprayed on the resulting puffed product (water content of 1.5%) in an amount of 60 parts by weight per 100 parts by weight of the product. Then 1% (based on the weight of the puffed product) common salt was sprinkled onto the product to which the palm and oil had been sprayed. The resulting puff snack had a sufficient taste peculiar to the pea and a heavy taste with sufficient toughness, could easily be mixed with the saliva and left a pleasant aftertaste.

COMPARATIVE EXAMPLE 1

The same procedures used in Example 3 were repeated except that pulverized pea (obtained by pulverizing pea together with the husk) having a water content of 8% was used as an ingredient. However, severe scorching and clogging were caused during the puffing treatment and any puffed product practically acceptable could not be obtained at all.

COMPARATIVE EXAMPLE 2

The same procedures used in Example 3 were repeated except that pulverized pea (obtained by pulverizing pea together with the husk) to which water had been added so as to adjust the water content thereof to 17% was used as an ingredient to give a puff snack. The resulting puff snack had the same soft taste with poor toughness as that observed for the conventionally known corn snack. Further, it had rather poor taste peculiar to the pea.

EXAMPLE 4

Pulverized pea (obtained by pulverizing pea together with the husk) having a water content of 10% was puffed in Collet Machine available from Tape Inc., i.e., a single-screw extruder provided with a die having two circular pores having a diameter of 3 mm at a die temperature of 100° C., a feed rate of 600 g/min and a number of revolution of 500 rpm and then the puffed product was cut into pieces having a length of the order of 4 cm (the degree of puffing=6.9).

Then the puffed product was dried by hot-air drying at 180° C. for 2 minutes and thereafter, palm oils were sprayed on the resulting puffed product (water content of 1.3%) in an amount of 60 parts by weight per 100 parts by weight of the product. Then 1% (based on the weight of the puffed product) common salt was sprinkled onto the product to which the palm oils had been sprayed. The resulting puff snack had a sufficient taste peculiar to the pea and a heavy taste with sufficient toughness, could easily be mixed with the saliva and left a pleasant aftertaste.

COMPARATIVE EXAMPLE 3

The same procedures used in Example 4 were repeated except that the die temperature was changed to 80° C. to carry out puffing in an extruder. However, the resulting product was not sufficiently puffed and could not eat as a puff snack.

COMPARATIVE EXAMPLE 4

The same procedures used in Example 4 were repeated except that the die temperature was changed to 200° C. to carry out puffing in an extruder. However, scorching was caused, the puffed product was broken and scattered in small pieces and thus any commercially acceptable puff snack could not be obtained.

COMPARATIVE EXAMPLE 5

The same procedures used in Example 4 were repeated except that the spraying of palm oils was omitted to give a puff snack. The resulting puff snack had a sufficient taste peculiar to the pea and a heavy taste with sufficient toughness, but could not easily be mixed with the saliva in the mouth and had a poor aftertaste.

EXAMPLE 5

Pulverized pea (obtained by pulverizing pea together with the husk; 69% of the total grains passed through a sieve having openings of 4000 μm and did not pass through a sieve having openings of 2000 μm) having a water content of 13% was puffed in Collet Machine available from Tape Inc., i.e., a single-screw extruder provided with a die having two circular pores having a diameter of 3 mm at a die temperature of 180° C., a feed rate of 600 g/min and a number of revolution of 500 rpm and then the resulting puffed product was cut into pieces having a length of the order of 4 cm (the degree of puffing=7.1).

Then an aqueous seasoning solution (comprising 57% of water, 40% of sugar and 3% of common salt) was sprayed onto the puffed product (water content of 1.3%) in an amount of 100 parts by weight per 100 parts by weight of the product. Thereafter, the product was dried by hot-air drying at 100° C. for 60 minutes and then palm oil were sprayed on the resulting puffed product in an amount of 60 parts by weight per 100 parts by weight of the product. The resulting puff snack had a sufficient taste peculiar to the pea and a heavy and crisp taste with sufficient toughness, could easily be mixed with the saliva in the mouth and left a pleasant aftertaste.

EXAMPLE 6

Pulverized broad bean (obtained by pulverizing broad bean together with the husk; 84% of the total grains passed through a sieve having openings of 3000 μm and did not pass through a sieve having openings of 1000 μm) having a water content of 14% was puffed in Collet Machine available from Tape Inc., i.e., a single-screw extruder provided with a die having two circular pores having a diameter of 3 mm at a die temperature of 190° C., a feed rate of 500 g/min and a number of revolution of 500 rpm and then the resulting puffed product was cut into pieces having a length of the order of 4 cm (the degree of puffing=13.2).

Then the puffed product was dried by hot-air drying at 160° C. for 5 minutes and thereafter, palm oil (200° C.) were sprayed on the resulting puffed product (water content of 1.3%) in an amount of 60 parts by weight per 100 parts by weight of the product. Then 1% (based on the weight of the puffed product) common salt was sprinkled onto the product to which the palm oils had been sprayed. The resulting puff snack had a sufficient taste peculiar to the broad bean and a heavy taste with sufficient toughness, could easily be mixed with the saliva in the mouth and left a pleasant aftertaste. Further, it had a taste of fried brood beam.

EXAMPLE 7

A mixture of 92 parts by weight of pulverized broad bean (obtained by adjusting the amount of the husk so that the coarse fiber content was equal to 4.0% and then pulverizing the broad bean; 84% of the total grains passed through a sieve having openings of 3000 μm and did not
pass through a sieve having openings of 1000 μm) having a water content of 14% and 8 parts by weight of defatted soybean (84% of the total grains passed through a sieve having openings of 3000 μm and did not pass through a sieve having openings of 1000 μm) was puffed in Collet Machine available from Tape Inc., i.e., a single-screw extruder provided with a die having two circular pores having a diameter of 3 mm at a die temperature of 190° C., a feed rate of 500 g/min and a number of revolution of 500 rpm and then the puffed product was cut into pieces having a length of the order of 4 cm (the degree of puffing=13.2).

Then the puffed product was dried by hot-air drying at 160° C. for 5 minutes and thereafter, vegitable oil were sprayed on the resulting puffed product (water content of 1.3%) in an amount of 60 parts by weight per 100 parts by weight of the product. Then 1% (based on the weight of the puffed product) common salt was sprinkled onto the product to which the vegitable oil had been sprayed. The resulting puff snack had a sufficient taste peculiar to the broad bean and a heavy taste with sufficient toughness, could easily be mixed with the saliva in the mouth and left a pleasant aftertaste. Further, it had a taste of fried broad bean.

EXAMPLE 8

Pulverized broad bean (obtained by pulverizing the broad bean together with the husk; 84% of the total grains passed through a sieve having openings of 3000 μm and did not pass through a sieve having openings of 1000 μm) having a water content of 16% was puffed in Collet Machine available from Tape Inc., i.e., a single-screw extruder provided with a die having two circular pores having a diameter of 3 mm at a die temperature of 215° C., a feed rate of 500 g/min and a number of revolution of 500 rpm and then the resulting puffed product was cut into pieces having a length of the order of 4 cm (the degree of puffing=13.0).

Then the puffed product was dried by hot-air drying at 160° C. for 5 minutes and thereafter, vegitable oil (200° C.) were sprayed on the resulting puffed product (water content of 1.3%) in an amount of 60 parts by weight per 100 parts by weight of the product. Then 1% of common salt was sprinkled onto the product to which the vegitable oil had been sprayed. The resulting puff snack had a sufficient taste peculiar to the broad bean and a heavy taste with sufficient toughness, could easily be mixed with the saliva in the mouth and left a pleasant aftertaste. Further, it had a taste of fried broad bean.

What is claimed is:

1. A method for preparing a puff snack comprising the steps of puffing an ingredient essentially consisting of a bean which may or may not have the husk and having a water content of 9 to 20% in an extruder having a die, wherein the temperature of the die ranges from 90° to 150° C. for said ingredient having a water content of 9 to 11%; the temperature of the die ranges from 100° to 210° C. for said ingredient having a water content of more than 11% and not more than 15%; and the temperature of the die ranges from 160° to 240° C. for said ingredient having a water content of more than 15% and not more than 20%; so that the degree of puffing falls within the range of from 3.0 to 28.0 times the volume of the bean to give a puff product having a water content of not more than 7% by weight or drying the puff product until the water content is not more than 7% by weight and then applying at least one material selected from the group consisting of fat and oil to the resulting puffed product.

2. The method of claim 1 wherein the fat or oil is applied onto the puffed product in an amount ranging from 30 to 150 parts by weight per 100 parts by weight of the puffed product.

3. The method of claim 2 wherein the fat or oil are applied at a temperature ranging from 150° to 220° C.

4. The method of claim 1 wherein the extruder used is a short screw type single-screw extruder.

5. The method of claim 1 wherein the bean ingredient is pea.

6. The method of claim 5 wherein the pea has a water content of 9 to 11% and is puffed in an extruder at a die temperature ranging from 90° to 150° C.

7. The method of claim 5 wherein the pea has a water content of more than 11% and not more than 15% and is puffed in an extruder at a die temperature ranging from 100° to 210° C.

8. The method of claim 7 wherein the pea is puffed in an extruder at a die temperature ranging from 140° to 210° C.

9. The method of claim 1 wherein the bean ingredient is entire bean grains and selected from those capable of passing through a sieve of 8000 μm mesh.

10. The method of claim 1 wherein the bean ingredient is broad bean.

11. The method of claim 10 wherein the broad bean has a water content of 9 to 11% and is puffed in an extruder at a die temperature ranging from 90° to 150° C.

12. The method of claim 10 wherein the broad bean has a water content of more than 11% and not more than 15% and is puffed in an extruder at a die temperature ranging from 100° to 210° C.

13. The method of claim 1 wherein the bean ingredient comprises 5 to 10 parts by weight of defatted soybean and 95 to 90 parts by weight of broad bean.

14. The method of claim 1 wherein the bean ingredient has a water content of more than 11% and not more than 15% and is puffed in an extruder at a die temperature ranging from 100° to 210° C.

15. The method of claim 1 wherein the degree of puffing ranges from 5.1 to 16.0.

16. The method of claim 1 wherein the bean ingredient is broad bean and the coarse fiber content thereof is controlled to 2.5 to 4.5% by weight.

17. The method of claim 1 wherein the water content of the puffed product after the drying is adjusted to not more than 2% by weight.

18. The method of claim 1 wherein the bean ingredient is pulverized pea grains which comprise not less than 45% by weight of the grains capable of passing through a sieve having openings of 4000 μm but incapable of passing through a sieve having openings of 1000 μm.

19. The method of claim 1 wherein the bean ingredient is pulverized broad bean grains which comprise not less than 60% by weight of the grains capable of passing through a sieve having openings of 4000 μm but incapable of passing through a sieve having openings of 1000 μm.

20. The method of claim 1 wherein an aqueous seasoning solution is applied to the puffed product before or after the fat or oil is applied thereto and then the product is dried.

* * * * *